US007222310B2

(12) United States Patent
Adam

(10) Patent No.: US 7,222,310 B2
(45) Date of Patent: May 22, 2007

(54) GRAPHICAL USER INTERFACE(GUI), A SYNTHESISER AND A COMPUTER SYSTEM INCLUDING A GUI

(75) Inventor: Chris Adam, Norderstedt (DE)

(73) Assignee: Apple Computer, Inc., Cupertino, CA (US)

( * ) Notice: Subject to any disclaimer, the term of this patent is extended or adjusted under 35 U.S.C. 154(b) by 748 days.

(21) Appl. No.: 10/428,809

(22) Filed: Apr. 30, 2003

(65) Prior Publication Data

US 2004/0221240 A1 Nov. 4, 2004

(51) Int. Cl.
*G06F 3/00* (2006.01)

(52) U.S. Cl. .................................................... 715/851

(58) Field of Classification Search ................. 715/851
See application file for complete search history.

(56) References Cited

U.S. PATENT DOCUMENTS 5,027,687 A * 7/1991 Iwamatsu .................... 84/600
5,204,969 A * 4/1993 Capps et al. ................ 704/278
6,067,072 A * 5/2000 Fujishita et al. ............ 715/727
2002/0108484 A1* 8/2002 Arnold et al. ................ 84/615
2003/0073927 A1* 4/2003 Johansen et al. ........... 600/559

* cited by examiner

*Primary Examiner*—Sy D. Luu
*Assistant Examiner*—Lê Nguyen
(74) *Attorney, Agent, or Firm*—Blakely, Sokoloff, Taylor & Zafman LLP

(57) ABSTRACT

The present invention relates to a graphical user interface (GUI), a synthesizer and a computer system including such a graphical user interface. In the prior art, input signals may be modified using a variety of controls including rotatable knobs or levers or switches or effected via software controls. Hitherto, the value of each signal has been represented in a dedicated manner even when signals are being combined and this adds to the complexity for a user.

The present invention thus relates to a graphical user interface for displaying three or more input signals; comprising a geometric display having the number of dimensions equal to one less than the number of signals whereby each signal represents an apex of the geometric display and a cursor is disposed within the geometric display and represents the combination of the signals.

11 Claims, 3 Drawing Sheets

GRAPHICAL USER INTERFACE(GUI), A SYNTHESISER AND A COMPUTER SYSTEM INCLUDING A GUI

FIELD OF THE INVENTION

The present invention relates to a graphical user interface (GUI), a synthesizer and a computer system including such a graphical user interface.

BACKGROUND OF THE INVENTION

To date, the generation, manipulation and modification of video and audio signals is now very complex. Such processing of video and audio signals is almost exclusively effected using dedicated hardware and/or in connection with a computer system. In either case, such processing often requires a hard disc drive, input mediums such as from cameras or musical instruments or synthesizers, output mediums such as speakers and screens or graphical user interfaces (GUI) and control mediums such as a computer keyboard, mouse, joystick or rollerballs. The hard disc drive contains system programs for operating the various hardware and software.

Primarily the user interacts with the hardware to generate, manipulate and modify signals using the graphical user interface (GUI). Typically, the GUI includes windows, icons and menus both pull down and pop up. The windows in a GUI are used to display data and in particular with audio and/or video signals, the data is displayed in a 2-dimensional graphic manner.

The input signals from whatever source are modified using a variety of controls including rotatable knobs or levers or switches or effected via software controls. Hitherto, the value of each signal has been represented in a dedicated manner even when signals are being combined. For example, three or more input signals to generate a sound wave each have a dedicated display indicating the value of the particular signal contributing to the sound wave. It is often difficult for a user to appreciate the contribution that each signal makes and when modifying one signal how that affects the balance with the other two signals.

In addition, more than one variable of the input signal may be varied. For example, the amplitude and/or frequency of the input signal may be varied. In a synthesizer, the wave form shape may be varied or style of signal such as selecting from different instruments.

COPYRIGHT NOTICE

A portion of the disclosure of this patent document contains material which is subject to copyright protection. The copyright owner has no objections to the facsimile reproduction by anyone of the patent document or the patent disclosure, as it appears in the Patent and Trade Mark Office patent file or records, but otherwise reserves all copyright rights whatsoever. Copyright Apple Computer, Inc. 2002.

SUMMARY OF THE INVENTION

The present invention is thus directed towards a graphical user interface (GUI), a synthesizer and a computer system including a graphical user interface which facilitates the mixing and display of audio and/or video signals.

The present invention relates to a graphical user interface for displaying three or more input signals; comprising a geometric display having the number of dimensions equal to one less than the number of signals whereby each signal represents an apex of the geometric display and a cursor is disposed within the geometric display and represents the combination of the signals.

The present invention also relates to a synthesizer and a computer system including such a graphical user interface.

BRIEF DESCRIPTION OF THE DRAWINGS

Embodiments of the present invention will now be described by way of further example only and with reference to the accompanying drawings, in which.

DETAILED DESCRIPTION OF THE INVENTION

Figure 1:
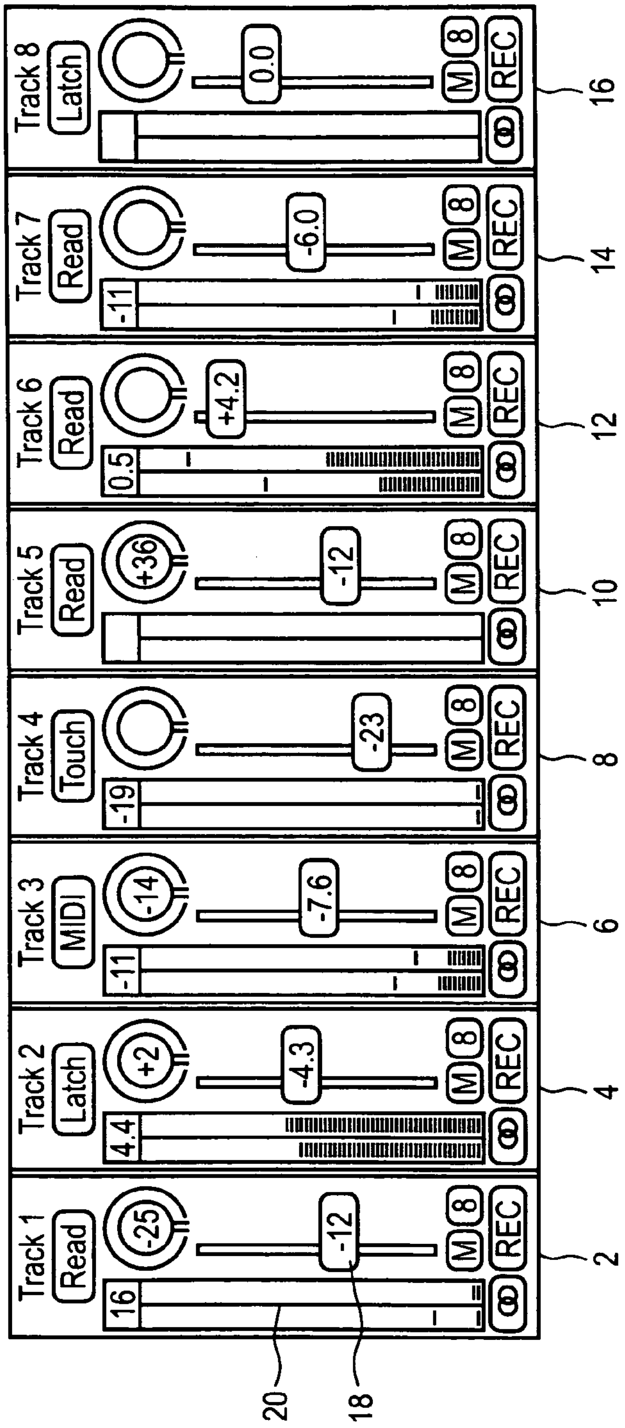
FIG. 1 illustrates a GUI of signal inputs according to the prior art.

FIG. 1 illustrates a graphical user interface including at least eight input signals 2, 4, 6, 8, 10, 12, 14 and 16 according to a typical prior art synthesizer. Each signal input has a control 18 comprising a lever rising on a scale 20 from zero to maximum. When a user wishes to mix these eight signals, each control 18 is moved to the desired position. However, it is difficult for a user to fully appreciate varying one or more signals and the relative impact that will have on the other signals.

Figure 2:
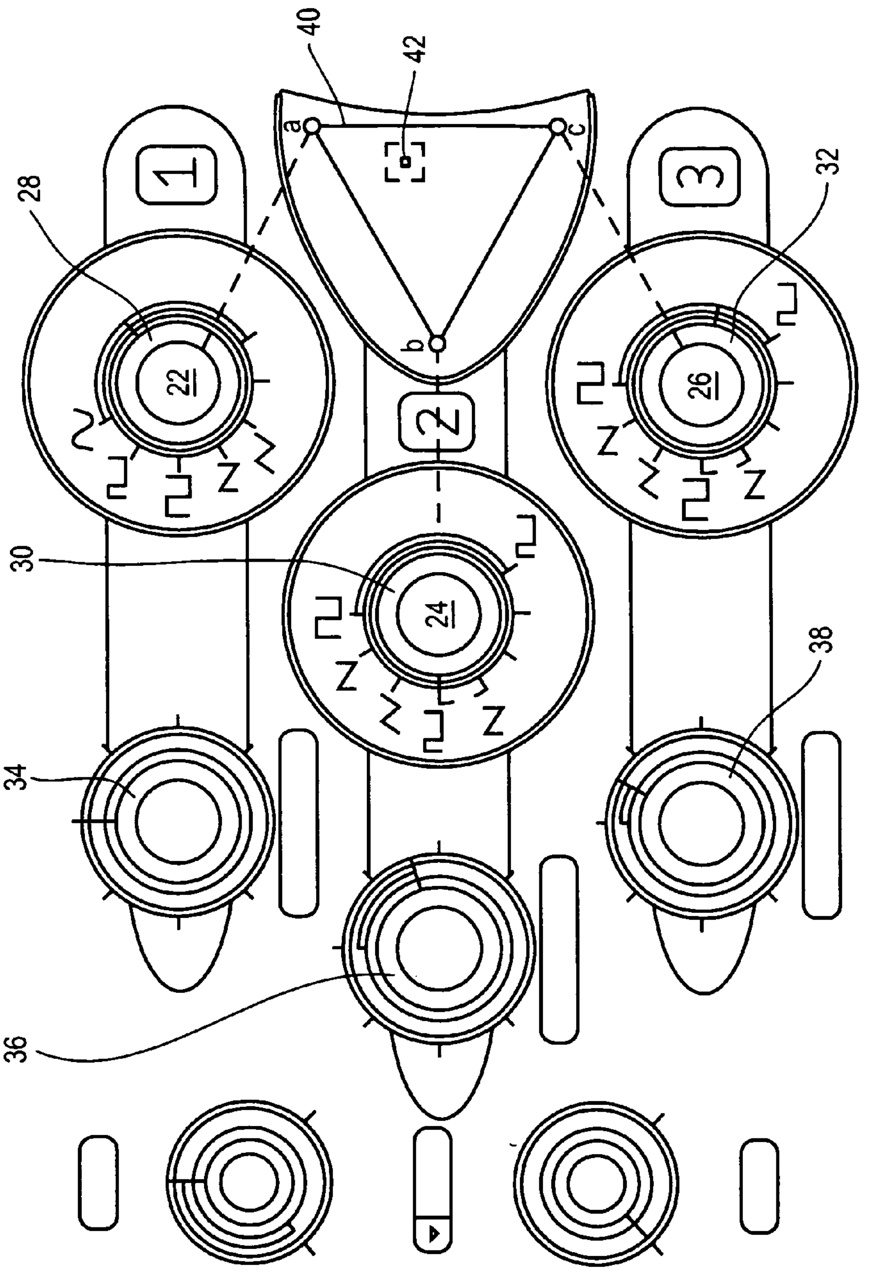
FIG. 2 illustrates a graphical user interface according to an embodiment of the present invention.

FIG. 2 illustrates a graphical user interface according to a first embodiment of the present invention. There are three input signals 22, 24 and 26. In this case, the input signals each comprise a sound wave generated by an oscillator whereby the wave form shape and frequency may be changed using primary controls 28, 30 and 32. There are also secondary controls 34, 36 and 38 to control the amplitude of each respective input signal. That is to say, the frequency and waveform shape of the input signal from oscillator 1 is controlled by primary control 28 and the amplitude is controlled by secondary control 34.

Each input signal is represented as an apex of a geometric display 40. In the embodiment there are three input signals so the graphic display comprises an isosceles triangle in two dimensions. If there were four signals, then the graphic display could comprises a triangular pyramid in three dimensions.

Each apex, a, b or c corresponds to an input signal. The signals are mixed with a variable ratio. However, the total level of the output is controlled such that the input signals being mixed always meets the following constraint $0 \leqq a+b+c \leqq 1$. With this constraint it is possible to reduce by one the number of input signals from three dimensions to two dimensions.

The geometric display also includes a cursor 42 representing the combination of the input signals. The cursor is bound to move within the geometric display.

The value of any one of the input signals is proportional to the position of the cursor with respect to the opposite side of the triangle.

In use, a user alters one or more primary controls and/or secondary controls. The user interface presents the combination of the three signals and the overall combination is represented by the cursor 42. If the cursor is disposed on one of the apices, then the input signal corresponding to that apex provides all of the output signal and the other two input signals are not contributing to the output signal. If only two input signals are contributing to the output signal, then the cursor will rest on one of the sides of the triangle. If all three input signals are contributing to the output signals, then the cursor will rest within the triangle. If all three input signals are contributing equally, then the cursor will rest at the center of the triangle.

When the shape of the graphic display is controlled such that the number of apices is equal to the number of input signals and the dimension of the display is equal to one less than the number of input signals, then it is possible to select only one input signal with the remainder having a zero value.

The graphical user interface enables a user to combine at least three input signals such that the combination is displayed on the geometric display. A change to the value of one input signal and it's impact on the other signals can be seen very easily. This is particularly important when combining three or more signals in a synthesizer. Moreover, the user interface easily provides the full extent of mixing between the input signals rather than any discrete mixing and most importantly enables only one input signal to be selected.

A synthesizer incorporating the graphical user interface may also include a memory. A user can thus record the input signals varying over time and then subsequently play back that recording from memory and this recorded output is then displayed on the GUI.

Figure 3:
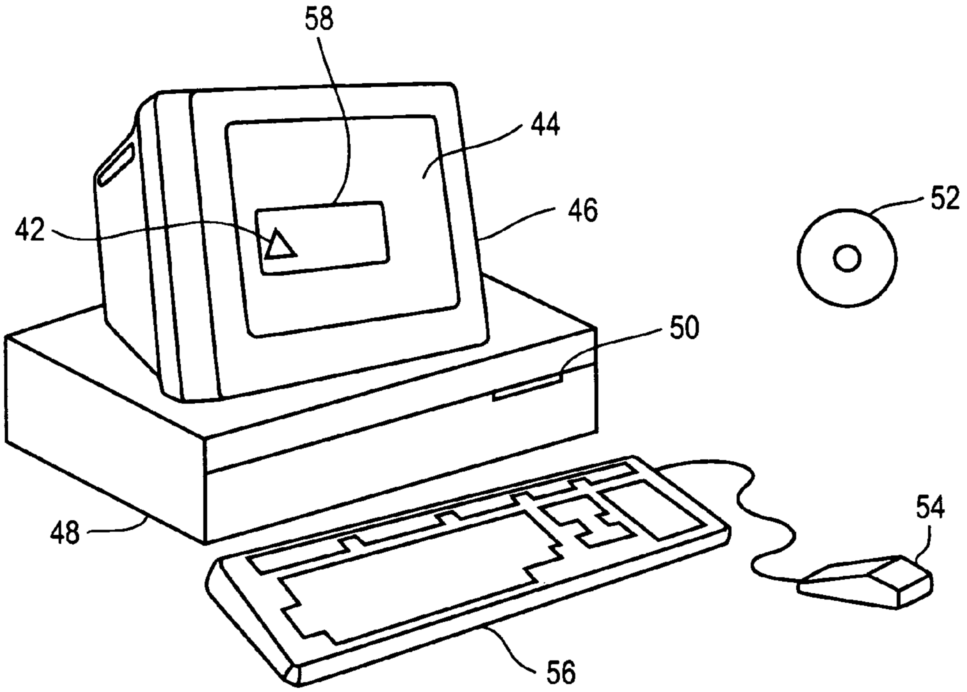
FIG. 3 illustrates computer system incorporating a graphical user interface in accordance with the present invention.

FIG. 3 illustrates a computer system which may include a graphic user interface as discussed above. The computer system comprises a screen 44 on a display monitor 46 which is connected to a hard disc drive 48 incorporating a temporary drive such as a CD-ROM, DVD, optical disc or floppy disc drive 50 in which is inserted a suitable data medium 52. The computer system also includes a mouse 54 and keyboard 56 both connected electrically to the hard disc drive. Other variations of the computer system can be envisaged. For example the use of a joystick or roller ball or stylus pen and/or a plurality of temporary and hard disc drives and/or connection of the computer system to the Internet and/or other applications of the computer system in a specific application which may not include a keyboard or mouse but rather input buttons and menus on the screen.

The screen includes the graphical user interface (GUI) 58 according to the present invention. The cursor 42 indicates the combination of the input signals on the geometric display on the screen. The mouse or keyboard allows the user to move the cursor.

The hard disc drive includes system computer software for controlling the computer system. The software also includes control of the GUI.

The foregoing description has been given by way of example only and it will be appreciated by a person skilled in the art that modifications can be made without departing from the scope of the present invention.

The invention claimed is:

1. A computer system having a display for displaying a graphical user interface for displaying three or more input signals, an input device for enabling a user to interact with the displayed graphical user interface, the graphical user interface comprising a geometric display having the number of dimensions equal to one less than the number of signals whereby each signal represents an apex of the geometric display and a cursor is disposed within the geometric display and represents the combination of the signals.

2. A graphical user interface as claimed in claim 1, in which there are three signals and the geometric display comprises an isosceles triangle in a two dimensions.

3. A graphical user interface as claimed in claim 1, in which there four signals and the geometric display comprises a triangular pyramid.

4. A graphical user interface as claimed in claim 1, further comprising a primary control for each input signal.

5. A graphical user interface as claimed in claim 4, in which said primary control controls the frequency of the input signal.

6. A graphical user interface as claimed in claim 4, further comprising a secondary control for each input signal.

7. A graphical user interface as claimed in claim 6, in which said secondary control controls the amplitude of the input signal.

8. A synthesiser including a graphical user interface as claimed in claim 1.

9. A synthesiser as claimed in claim 8, in which said input signals are each generated using an oscillator.

10. A synthesiser as claimed in claim 8, further comprising a memory for recording the input signals varying with time.

11. A computer system including a graphical user interface as claimed in claim 1.

* * * * *